(12) United States Patent
Yeo et al.

(10) Patent No.: US 10,499,423 B2
(45) Date of Patent: Dec. 3, 2019

(54) CHANNEL ALLOCATION SYSTEM AND METHOD FOR ACCOMMODATING MULTIPLE NODES IN SENSOR NETWORK

(71) Applicant: ELECTRONICS AND TELECOMMUNICATIONS RESEARCH INSTITUTE, Daejeon (KR)

(72) Inventors: Geon Min Yeo, Daejeon (KR); Young Il Kim, Daejeon (KR); Hyun Woo Lee, Seoul (KR); Yong Tae Lee, Daejeon (KR); Dae Geun Park, Daejeon (KR); Soon Yong Song, Sejong-si (KR)

(73) Assignee: ELECTRONICS AND TELECOMMUNICATIONS RESEARCH INSTITUTE, Daejeon (KR)

(*) Notice: Subject to any disclaimer, the term of this patent is extended or adjusted under 35 U.S.C. 154(b) by 0 days.

(21) Appl. No.: 15/837,093

(22) Filed: Dec. 11, 2017

(65) Prior Publication Data

US 2018/0167969 A1 Jun. 14, 2018

(30) Foreign Application Priority Data

Dec. 13, 2016 (KR) .................. 10-2016-0169799

(51) Int. Cl.
*H04W 4/00* (2018.01)
*H04W 74/02* (2009.01)
*H04W 72/12* (2009.01)
*H04W 84/18* (2009.01)
*H04W 74/00* (2009.01)

(52) U.S. Cl.
CPC ......... *H04W 74/02* (2013.01); *H04W 72/121* (2013.01); *H04W 74/006* (2013.01); *H04W 84/18* (2013.01); *Y02D 70/00* (2018.01); *Y02D 70/10* (2018.01); *Y02D 70/12* (2018.01);
(Continued)

(58) Field of Classification Search
CPC .................................................... H04W 74/02
See application file for complete search history.

(56) References Cited

U.S. PATENT DOCUMENTS 8,228,934 B2   7/2012   Jeong et al.
8,989,211 B2   3/2015   Jeong et al.
(Continued)

FOREIGN PATENT DOCUMENTS

| KR | 10-2007-0033492 A | 3/2007 |
| KR | 10-2009-0112942 A | 10/2009 |
| KR | 10-2016-0001085 A | 1/2016 |

*Primary Examiner* — Gerald A Smarth
(74) *Attorney, Agent, or Firm* — LRK Patent Law Firm (57) ABSTRACT

A channel allocation system for accommodating a plurality of nodes in a sensor network includes a PAN coordinator generating channel allocation information and CSMA idle information and transmitting a beacon including the channel allocation information and the CSMA idle information; and at least one node receiving the beacon, determining whether the contention period is in idle state based on the extracted channel allocation information and the CSMA idle information, determine a transmission time, an operation state in a reception interval, how to process received data by determining whether a channel is allocated based on whether the contention period is in idle state, and operating according to the determination result.

13 Claims, 5 Drawing Sheets

(52) U.S. Cl.
CPC ........ *Y02D 70/126* (2018.01); *Y02D 70/1262* (2018.01); *Y02D 70/144* (2018.01)

(56) References Cited

U.S. PATENT DOCUMENTS

| | | |
|---|---|---|
| 2007/0064625 A1 | 3/2007 | Lim et al. |
| 2009/0129353 A1* | 5/2009 | Ki ................. H04W 74/0816 370/338 |
| 2009/0238160 A1* | 9/2009 | Bhatti ............... H04L 1/1614 370/338 |
| 2010/0034159 A1* | 2/2010 | Shin ............... H04W 72/1257 370/329 |
| 2010/0142509 A1* | 6/2010 | Zhu .................. H04B 1/1607 370/343 |
| 2010/0195601 A1* | 8/2010 | Zhang ................ H04W 74/04 370/329 |
| 2013/0242905 A1* | 9/2013 | Rasband .......... H04W 56/0015 370/329 |
| 2015/0208348 A1* | 7/2015 | Kojima ........... H04W 56/0015 370/350 |
| 2015/0382262 A1 | 12/2015 | Cho et al. |

\* cited by examiner

CHANNEL ALLOCATION SYSTEM AND METHOD FOR ACCOMMODATING MULTIPLE NODES IN SENSOR NETWORK

CROSS-REFERENCE TO RELATED APPLICATION

This application claims priority to Korean Patent Application No. 10-2016-0169799, filed Dec. 13, 2016 in the Korean Intellectual Property Office (KIPO), the entire content of which is hereby incorporated by reference.

BACKGROUND

1. Technical Field

The present disclosure relates to a channel allocation scheme for accommodating multiple nodes in a sensor network, and more particularly, to a channel allocation system and a channel allocation method for accommodating multiple nodes in a sensor network, which can increase transmissions by a coordinator based on guaranteed time slot (GTS) and reduce power consumption of end sensor nodes.

2. Description of Related Art

The wireless sensor communication may be referred to as a communication method for wirelessly transmitting sensing information generated by a sensor to a final destination. It is based on low data transmission rate as compared to cellular communications such as long-term evolution (LIT), and, mainly driven by battery in an environment where it is difficult to supply power by wire.

Also, since it is required to operate in a limited power situation, transmission power is limited, thereby forming a relatively short radio communication range. Therefore, in order to expand such the limited communication range due to the low transmission power, a device corresponding to a role of a repeater in the cellular communications is required.

One of the representative international standards used for the wireless sensor communication is institute of electrical and electronic engineers (IEEE) 802.15.4, which defines a physical (PHY) layer and a medium access control (MAC) layer for low power communications, and interfaces with an upper layer for application services.

In the IEEE 802.15.4, a 1-tier personal area network (PAN) structure in which a plurality of sensor nodes are associated with a PAN coordinator is generally used. The PAN coordinator may broadcast beacons including PAN configuration related information at a predetermined time interval (i.e., beacon interval), and the sensor nodes in the PAN synchronize with the PAN coordinator using beacons in order to perform data transmission and reception. Also, according to the IEEE 802.15.4, an active period may be defined as a period during which data transmission is performed, and an inactive period may be defined as a period during which data transmission is not performed. There are two data transmission methods for the active period, one using a contention access period (CAP) and another using a contention free period (CFP).

In the CAP, transmission is performed based on a carrier sensing multiple access-collision avoidance (CSMA-CA) scheme. In the CPF, transmission is performed based on a guaranteed time slot (GTS) scheme. Here, the GTS may be understood as a dedicated transmission channel for a specific device.

That is, when transmissions are performed by two or more devices at the same time in the CAP during which any devices in the PAN can attempt to transmit and receive data, a transmission collision may occur. On the other hand, in the CFP, a dedicated transmission and reception time (i.e., GTS) is allocated to a specific device, so that collisions can be avoided.

However, since the number of available GTSs is limited in a wireless frame, the number of GTSs that can guarantee fixed transmission rates for multiple sensor nodes is insufficient. Therefore, in the CAP, the sensor nodes should continuously perform monitoring on a channel and consume power for the monitoring.

SUMMARY

Accordingly, exemplary embodiments of the present disclosure are provided to substantially obviate one or more problems due to limitations and disadvantages of the related art.

Exemplary embodiments of the present disclosure provide channel allocation methods for accommodating a plurality of sensor nodes in a sensor network, which can enable low power operation of the sensor network and fixed rate transmissions by providing a transmission sharing mechanism based on a dedicated channel and removing unnecessary reception power consumption. Also, exemplary embodiments of the present disclosure provide a channel allocation system for the same.

Technical objects of the present disclosure are not limited to the aforementioned technical objects and other technical objects which are not mentioned will be apparently appreciated by those skilled in the art from the following description.

In order to achieve the above-described objective, an aspect of the present disclosure provides a channel allocation system for accommodating a plurality of nodes in a sensor network. The channel allocation system may comprise a personal area network (PAN) coordinator generating channel allocation information by identifying presence of an available channel based on a channel allocation request received from at least one node in a contention-free period (CFP), generating carrier sensing multiple access (CSMA) idle information according to whether data to be transmitted to one of the plurality of nodes exists in a contention access period (CAP), and transmitting a beacon including the channel allocation information and the CSMA idle information; and at least one node receiving the beacon, extracting the channel allocation information and the CSMA idle information from the beacon, determining whether the CAP is in idle state based on the extracted channel allocation information and the CSMA idle information, determine a transmission time, an operation state in a reception interval, how to process received data by determining whether a channel is allocated based on whether the CAP is in idle state, and operating according to the determination result.

When the available channel is present in the CFP, the PAN coordinator may generate the channel allocation information having a format of a beacon sequence number (BSN), number of channels, and at least one set of {node address, starting slot, and channel size}.

When the available channel is not present in the CFP, the PAN coordinator may generate the channel allocation information having a format of a beacon sequence number (BSN), number of channels, at least one set of {node address, starting slot, and channel size}, number of shared channels, and at least one set of {channel number, and node address}.

The PAN coordinator may set a CSMA collision avoidance (CSMA-CA) transmission (TX) indication to a value when there is no data to be transmitted in the CAP, and may set the CSMA-CA TX indication to another value when there is data to be transmitted in the CAP. Also, the PAN coordinator may generate the CSMA idle information having a format of the CSMA-CA TX indication, number of nodes, and a set of node addresses.

When the CAP is in idle state, the at least one node may determine whether or not a channel is allocated to the at least one node. Also, when a channel is allocated to the at least one node, the at least one node may determine a transmission time by checking a channel sharing status, keep a reception function turned off until the transmission time, transmit data at the transmission time, and keep the reception function turned off until reception of a next beacon. Also, when a channel is not allocated to the at least one node, the at least one node may keep the reception function turned off continuously until reception of the next beacon.

When the CAP is not in idle state, the at least one node may determine whether or not a channel is allocated to the at least one node. Also, when a channel is allocated to the at least one node, the at least one node may determine a transmission time, receive data during the CAP, process the received data, turn off a reception function after the CAP ends, and transmit data at the transmission time while keeping the reception function turned off except for the transmission time. Also, when a channel is not allocated to the at least one node, the at least one node may keep the reception function turned off continuously until reception of the next beacon.

The at least one node may obtain information on a channel allocated to the at least one node and information on whether the allocated channel is shared by another node from the channel allocation information, transmit data through the allocated channel of every frame when the allocated channel is a dedicated channel, and determine a total number of nodes sharing the allocated channel and a frame used for transmission of the at least one node based on a beacon sequence number (BSN) when the allocated channel is a shared channel.

The at least one node may determine whether each frame is a frame used for transmission of the at least one node, and transmit data through a frame determined as the frame used for transmission of the at least one node in order to avoid transmission collisions with other nodes.

The at least one node may determine whether there is data to be received at the at least one node during the CAP by analyzing the CSMA idle information, receive the data during the CAP by turning on a reception function when there is data to be received, and keep the reception function turned off during the CAP when there is no data to be received.

In order to achieve the above-described objective, another aspect of the present disclosure provides a channel allocation method for accommodating a plurality of sensor nodes in a sensor network. The channel allocation method may comprise generating, by a personal area network (PAN) coordinator, channel allocation information by identifying presence of an available channel based on a channel allocation request received from at least one node in a contention-free period (CFP); generating, by the PAN coordinator, carrier sensing multiple access (CSMA) idle information according to whether data to be transmitted to one of the plurality of nodes exists in a contention access period (CAP); transmitting, by the PAN coordinator, a beacon including the channel allocation information and the CSMA idle information; receiving, by a sensor node of the plurality of sensor nodes, the beacon; extracting, by the sensor node, the channel allocation information and the CSMA idle information from the beacon; determining, by the sensor node, whether the CAP is in idle state based on the extracted channel allocation information and the CSMA idle information; and determining, by the sensor node, a transmission time, an operation state in a reception interval, how to process received data by determining whether a channel is allocated based on whether the CAP is in idle state, and operating according to the determination result.

When the available channel is present in the CFP, the PAN coordinator may generate the channel allocation information having a format of a beacon sequence number (BSN), number of channels, and at least one set of {node address, starting slot, and channel size}.

When the available channel is not present in the CFP, the PAN coordinator may generate the channel allocation information having a format of a beacon sequence number (BSN), number of channels, at least one set of {node address, starting slot, and channel size}, number of shared channels, and at least one set of {channel number, and node address}.

The PAN coordinator may set a CSMA collision avoidance (CSMA-CA) transmission (TX) indication to a value when there is no data to be transmitted in the CAP, and may set the CSMA-CA TX indication to another value when there is data to be transmitted in the CAP. Also, the PAN coordinator may generate the CSMA idle information having a format of the CSMA-CA TX indication, number of nodes, and a set of node addresses.

When the CAP is in idle state, the at least one node may determine whether or not a channel is allocated to the at least one node. Also, when a channel is allocated to the at least one node, the at least one node may determine a transmission time by checking a channel sharing status, keep a reception function turned off until the transmission time, transmit data at the transmission time, and keep the reception function turned off until reception of a next beacon. Also, when a channel is not allocated to the at least one node, the at least one node may keep the reception function turned off continuously until reception of the next beacon.

When the CAP is not in idle state, the at least one node may determine whether or not a channel is allocated to the at least one node. Also, when a channel is allocated to the at least one node, the at least one node may determine a transmission time, receive data during the CAP, process the received data, turn off a reception function after the CAP ends, and transmit data at the transmission time while keeping the reception function turned off except for the transmission time. Also, when a channel is not allocated to the at least one node, the at least one node may keep the reception function turned off continuously until reception of the next beacon.

The at least one node may obtain information on a channel allocated to the at least one node and information on whether the allocated channel is shared by another node from the channel allocation information, transmit data through the allocated channel of every frame when the allocated channel is a dedicated channel, and determine a total number of nodes sharing the allocated channel and a frame used for transmission of the at least one node based on a beacon sequence number (BSN) when the allocated channel is a shared channel.

The at least one node may determine whether each frame is a frame used for transmission of the at least one node, and transmit data through a frame determined as the frame used for transmission of the at least one node in order to avoid transmission collisions with other nodes.

The at least one node may determine whether there is data to be received at the at least one node during the CAP by analyzing the CSMA idle information, receive the data during the CAP by turning on a reception function when there is data to be received, and keep the reception function turned off during the CAP when there is no data to be received.

The embodiments of the present disclosure can greatly reduce the reception power of sensor nodes by reducing unnecessary reception intervals by providing the flexibility of radio resource allocation in the sensor network and the low power based operation. Thus, the number of sensor nodes having a fixed transmission rate can be remarkably increased.

BRIEF DESCRIPTION OF DRAWINGS

Exemplary embodiments of the present disclosure will become more apparent by describing in detail exemplary embodiments of the present disclosure with reference to the accompanying drawings, in which.

DETAILED DESCRIPTION OF EXEMPLARY EMBODIMENTS

The following detailed description is provided to assist the reader in gaining a comprehensive understanding of the methods, apparatuses, and/or systems described herein. However, various changes, modifications, and equivalents of the systems, apparatuses and/or methods described herein will be apparent to one of ordinary skill in the art. Also, descriptions of functions and constructions that are well known to one of ordinary skill in the art may be omitted for increased clarity and conciseness.

Throughout the drawings and the detailed description, the same reference numerals refer to the same elements. The drawings may not be to scale, and the relative size, proportions, and depiction of elements in the drawings may be exaggerated for clarity, illustration, and convenience.

The features described herein may be embodied in different forms, and are not to be construed as being limited to the examples described herein. Rather, the examples described herein have been provided so that this disclosure will be thorough and complete, and will convey the full scope of the disclosure to one of ordinary skill in the art.

Combinations of respective blocks in an accompanying block diagram and respective operations in a flowchart may be performed by computer program instructions. These computer program instructions can be mounted on a processor of a general purpose computer, a special purpose computer, or other programmable data processing equipment, and thus the instructions performed by the processor of the computer or other programmable data processing equipment generate a means for performing functions described in the respective blocks of the block diagram or the respective operations of the flowchart. To implement functions in a specific way, these computer program instructions can be stored in a computer-usable or computer-readable memory capable of aiming for a computer or other programmable data processing equipment, so that the instructions stored in the computer-usable or computer-readable memory can also produce a manufactured item including an instruction means for performing functions described in the respective blocks of the block diagram or the respective operations of the flowchart.

In addition, each block or operation may indicate a part of a module, a segment or a code including one or more executable instructions for executing specific logical function(s). It should be noted that mentioned functions described in blocks or operations can be executed out of order in some alternative embodiments. For example, two consecutively shown blocks or operations can be performed substantially at the same time, or can be performed in a reverse order according to the corresponding functions.

Hereinafter, exemplary embodiments according to the present disclosure will be described in detail by referring to accompanying drawings. However, the exemplary embodiments according to the present disclosure may be changed into various forms, and thus the scope of the present disclosure is not limited to the exemplary embodiments which will be described. The exemplary embodiments are provided to assist the one of ordinary skill in the art. in gaining a comprehensive understanding of the methods, apparatuses, and/or systems described herein.

Figure 1:
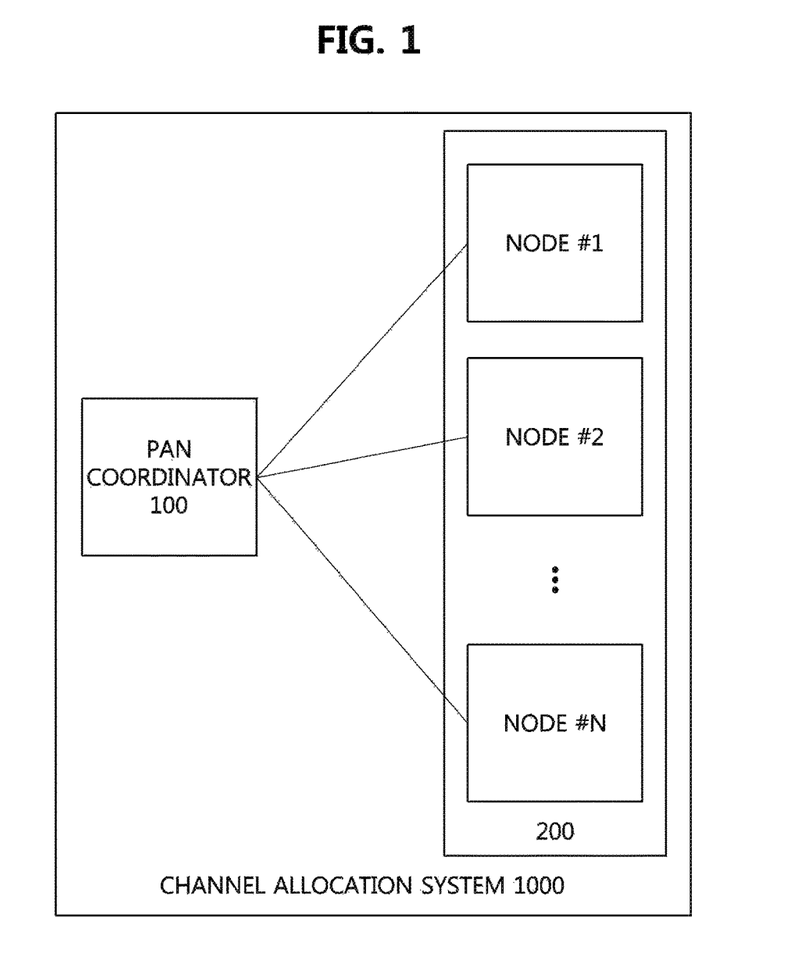
FIG. 1 is a diagram illustrating a channel allocation system for accommodating a plurality of nodes in a sensor network according to an embodiment of the present disclosure.

FIG. 1 is a diagram illustrating a channel allocation system for accommodating a plurality of nodes in a sensor network according to an embodiment of the present disclosure.

Referring to FIG. 1, a channel allocation system 1000 for accommodating a plurality of nodes in a sensor network may comprise a personal area network (PAN) coordinator 100 and at least one node 200.

In a contention-free period (also referred to as 'CFP'), the PAN coordinator 100 may analyze a channel allocation request received from one of the at least one node 200 to check whether there is an available channel, and generate channel allocation information according to the check result.

Also, in a contention period (also referred to as 'CAP'), the PAN coordinator 100 may generate carrier sensing multiple access (CSMA) idle information according to whether there is data to be transmitted to the at least one node 200, and transmit a beacon including the generated channel allocation information and the CSMA idle information.

Figure 2:
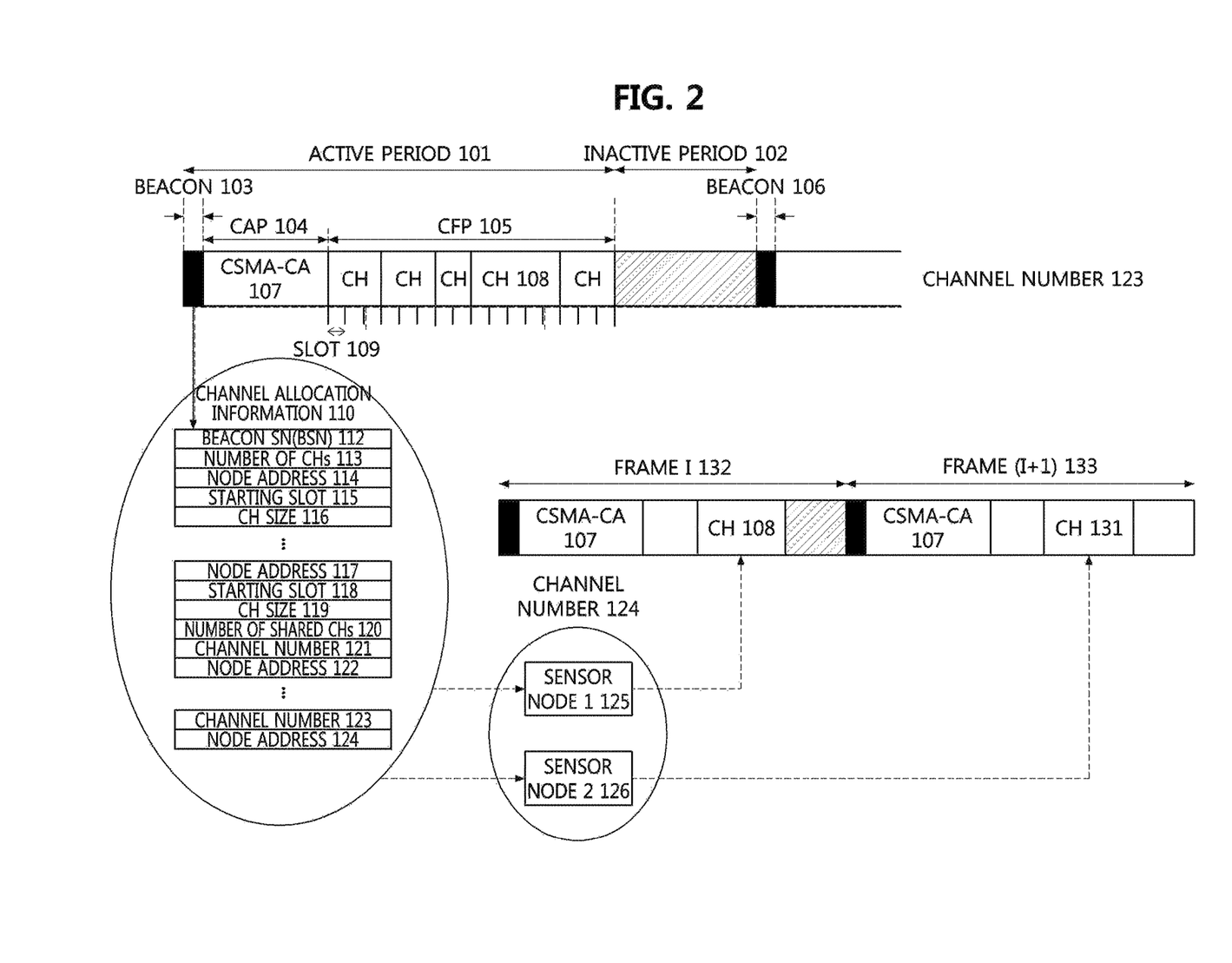
FIG. 2 is a diagram illustrating channel allocation information generated in a contention-free period according to an embodiment of the present disclosure.

Referring to FIG. 2, in case that there is a channel available in the CFP, the available channel may be allocated dedicatedly, and channel allocation information having a format of [beacon sequence number (BSN) 112, number of channels (CHs) 113, at least one set of {node address 114, starting slot 115, CH size 116}] may be generated.

Referring to FIG. 2, in case that there is no available channel in the CFP, a channel having capacity closest to a transmission amount requested by the channel allocation request may be selected among currently used channels as a shared channel, and channel allocation information having a format of [BSN 112, number of CHs 113, at least one set of {node address 117, starting slot 118, CH size 119}, number of shared CHs 120, at least one set of {CH number 121, node address 122}] may be generated.

According to the present embodiment, the CSMA idle information may have a format of [CSMA-CA transmission (TX) Indication, number of nodes, at least one set of {node address}].

The CSMA-CA TX indication may be set to a value (e.g., '1') when there is no data to be transmitted to a node in the CAP, and the CSMA-CA TX indication may be set to another value (e.g., '0') when there is data to be transmitted to a node in the CAP.

The at least one node 200 may extract the channel allocation information and the CSMA idle information from the received beacon, and determine whether the CAP is in idle state by using the extracted channel allocation information and CSMA Idle information.

Also, according to the determination result, the at least one node 200 may determine whether a channel is allocated in the CAP, a transmission time, an operation state in a reception period, and how to process received data, and may operate according to the determined transmission timing, operation state, and the like.

For example, in case that the CAP is in idle state, the at least one node 200 may determine whether a channel is allocated or not, and if the allocated channel exists, the at least one node 200 may determine the transmission time by checking a channel sharing status. Also, the at least one node 200 may keep its reception (RX) function turned off until a channel transmission time according to the determined transmission time, transmit data at the transmission time, and keep the RX function turned off continuously until reception of a next beacon. On the other hand, if the allocated channel does not exist, the RX function of the at least one node 200 may be kept as turned off until the next beacon is received.

For example, in case that the CAP is not in idle state, the at least one node may determine whether a channel is allocated or not, and if the allocated channel exists, the at least one node 200 may determine the transmission time by checking a channel sharing status. The at least one node 200 may receive data during the CAP, process the received data, and turn off its RX function after the CAP ends. Also, the at least one node 200 may transmit data only at the transmission time, and keep the RX function turned off except for the transmission time. On the other hand, if the allocated channel does not exist, the at least one node 200 may receive data during the CAP, process the received data, and keep the RX function turned off until the next beacon is received.

According to the present embodiment, information on the allocated channel and information on whether the allocated channel is shared or not may be obtained from the channel allocation information, and data may be transmitted through the allocated channel every frame if the allocated channel is a dedicatedly allocated channel. Also, if the allocated channel is a shared channel, the total number of nodes allocated to the shared channel may be calculated, and a frame to be transmitted by each node may be determined based on the BSN.

According to the present embodiment, the at least one node 200 may determine whether each of every frame is a frame used for transmission of each node, and transmit data through the frame according to the determination result, thereby avoiding transmission collisions between the nodes. Also, the CSMA idle information may be analyzed to determine whether or not data is received at each node in the CAP. When there is data to be received, the corresponding node may receive data by turning on its reception function during the CAP. If there is no data to be received, the corresponding node may turn off the reception function during the CAP.

FIG. 2 is a diagram illustrating channel allocation information generated in a contention-free period according to an embodiment of the present disclosure.

According to an embodiment of the present disclosure, the PAN coordinator 100 may generate channel allocation information and transmit the channel allocation information in a beacon.

Referring to FIG. 2, there are a limited number of channels in a CFP, and each channel may be configured in unit of slots.

When receiving a channel allocation request from an arbitrary node, in case that all of the channels in the CFP are currently in use, the PAN coordinator may select a channel having a capacity closest to the transmission amount requested by the channel allocation request among the currently used channels as a shared channel.

For example, when there is no shared channel, the channel allocation information may be generated as having a form of [BSN 112, number of CHs 113, at least one set of {node address 114, starting slot 115, CH size 116}].

Also, when there is a shared channel, the channel allocation information may be generated as having a form of [BSN 112, number of CHs 113, at least one set of {node address 117, starting slot 118, CH size 119}, number of shared CHs 120, at least one set of {CH number 121, node address 122}].

According to the present embodiment, the at least one node 200 receiving the beacon may identify information on the allocated channel and whether or not the allocated channel is a shared channel. If the allocated channel is a channel which can be used dedicatedly, data may be transmitted through the corresponding channel every frame. If the allocated channel is a channel shared with other nodes, the corresponding node may derive the total number of nodes allocated to the channel and determine a frame which can be used for transmission based on the BSN. Then, data may be transmitted based on whether or not each frame is a frame used for transmission, so that a transmission collision between the nodes can be obtained.

According to an embodiment of the present disclosure, the channel allocation information may be updated when a channel allocation request is made.

Figure 3:
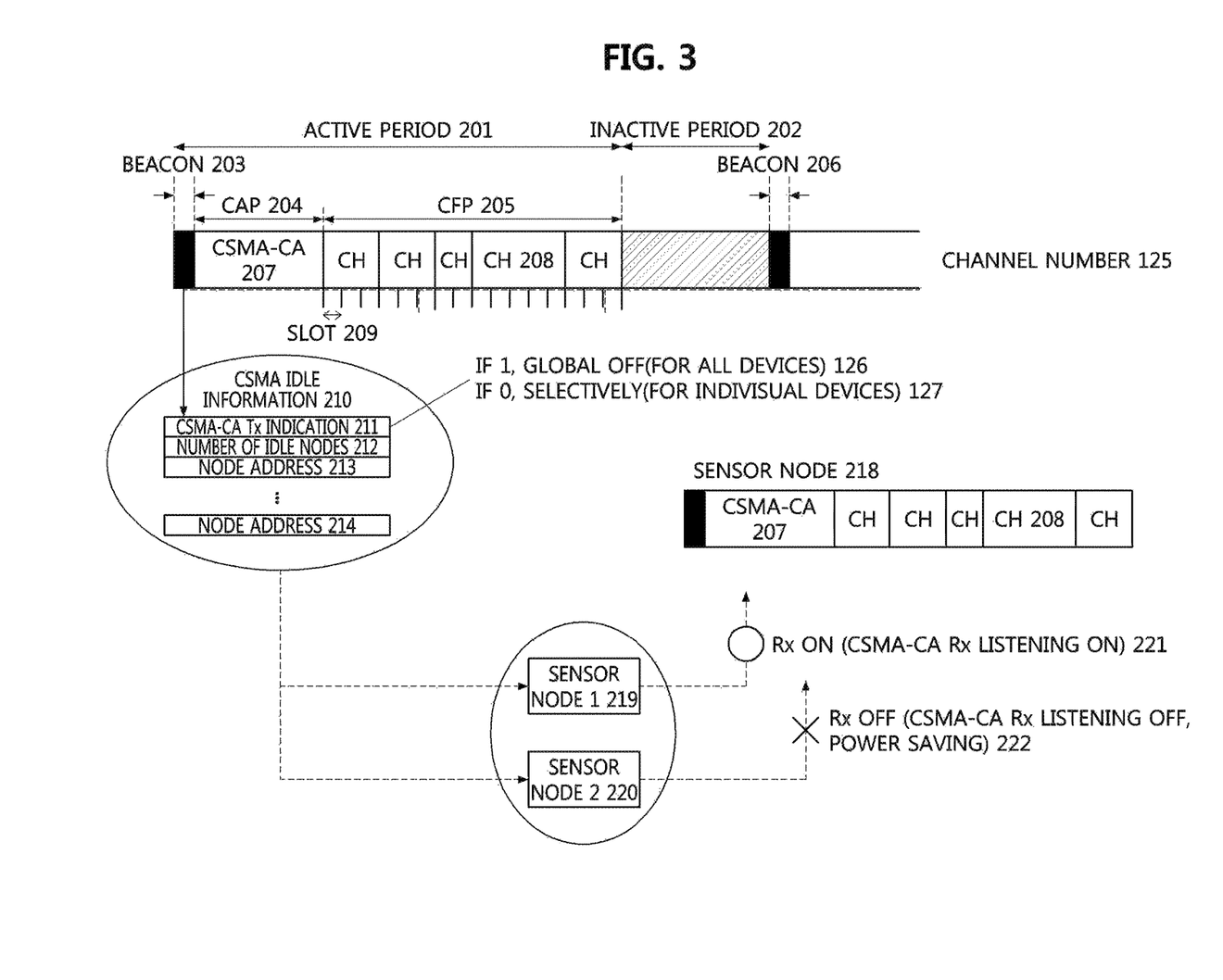
FIG. 3 is a diagram illustrating CSMA idle information generated in a contention period according to an embodiment of the present disclosure.

FIG. 3 is a diagram illustrating CSMA idle information generated in a contention period according to an embodiment of the present disclosure.

According to an embodiment of the present disclosure, the PAN coordinator may control data transmission in the contention period by determining presence or absence of data transmitted to nodes using the contention period.

Referring to FIG. 3, contention based data transmission control may be performed through CSMA idle information.

For example, the PAN coordinator 100 may set the CSMA-CA TX indication to a value (e.g., '1') when there is no data to be transmitted to any nodes connected to the PAN coordinator 100 through the current frame, and set the CSMA-CA TX indication to another value (e.g., '0') when there is data to be transmitted to any nodes connected to the PAN coordinator 100 through the current frame.

Also, the CSMA idle information including the CSMA-CA TX indication 210 and [number of idle nodes 212, set of {node address 213}] may be generated and transmitted as included in the beacon.

A node receiving the CSMA idle information through the beacon may determine presence or absence of data transmitted to itself during the CAP.

In this case, if there is data to be transmitted to the node, the node may receive data by turning on its reception function during the CAP, and if there is no data to be transmitted to the node, the node may turn off its reception function during the CAP. The node that has received data during the CAP may keep the reception function turned off and transmit the data when the transmission time at which its channel is allocated is reached.

Figure 4:
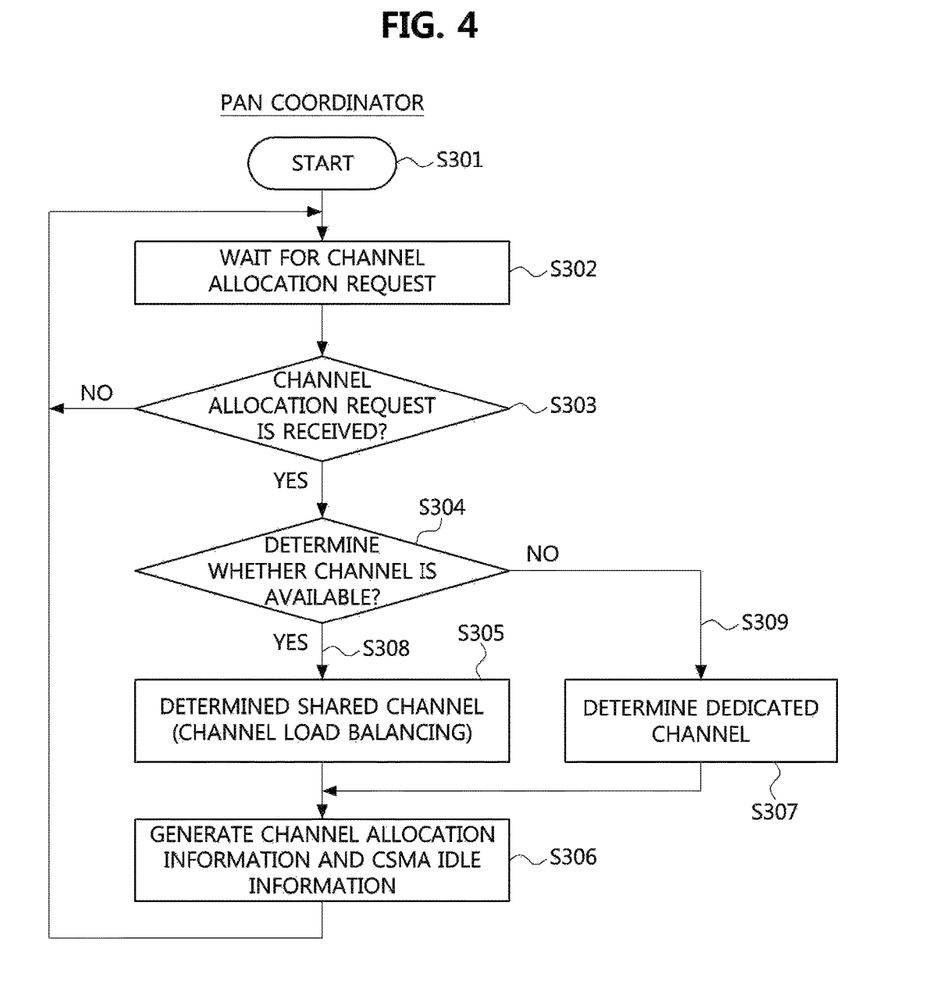
FIG. 4 is a flowchart for explaining a channel allocation method for accommodating a plurality of nodes in a sensor network, which is performed at the PAN coordinator shown in FIG. 1, according to an embodiment of the present disclosure.

FIG. 4 is a flowchart for explaining a channel allocation method for accommodating a plurality of nodes in a sensor network, which is performed at the PAN coordinator shown in FIG. 1 according to an embodiment of the present disclosure.

According to an exemplary embodiment of the present disclosure, the PAN coordinator 100 may wait for a channel allocation request from connected nodes (S302).

Upon receipt of a channel allocation request from a particular node (S303), the PAN coordinator 100 may determine whether a currently available channel is present (S304). At this time, when there is no available channel (S308), a channel having a capacity closest to the requested channel transmission amount may be selected as a shared channel among the currently used channels (S305). If there is an available channel (S309), the available channel may be allocated dedicatedly (S307).

According to an embodiment of the present disclosure, channel allocation information including the above-described allocation information may be generated and transmitted as included in a beacon.

According to an embodiment of the present disclosure, the PAN coordinator 100 may set the CSMA-CA TX indication set to '1' when there is no data to be transmitted to any nodes connected to the PAN coordinator 100 in the CAP, and may set the CSMA-CA TX Indication to '0' when there is data to be transmitted to any specific nodes connected to the PAN coordinator 100 in the CAP. Also, the PAN coordinator 100 may generate CSMA idle information including the CSMA-CA TX indication and at least one address of the any specific nodes.

According to an embodiment of the present disclosure, the beacon may be transmitted based on channel allocated information and the CSMA idle information in the same frame.

Figure 5:
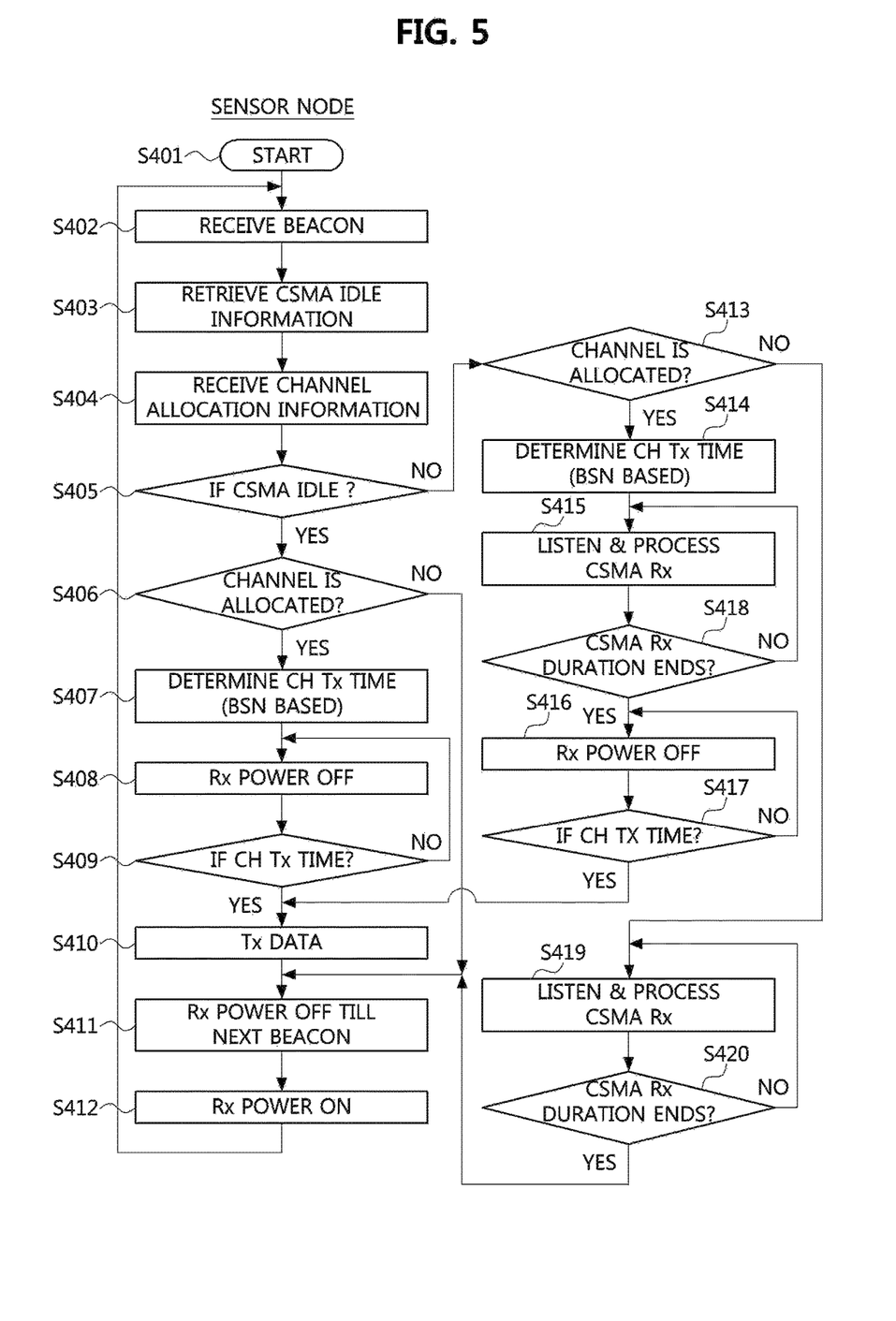
FIG. 5 is a flow chart for explaining a channel allocation method for accommodating a plurality of nodes in a sensor network, which is performed at a node shown in FIG. 1, according to an embodiment of the present disclosure.

FIG. 5 is a flow chart for explaining a channel allocation method for accommodating a plurality of nodes in a sensor network, which is performed at a node shown in FIG. 1, according to an embodiment of the present disclosure.

According to the present embodiment, a node may extract the channel allocation information and the CSMA idle information from the beacon received from the PAN coordinator 100. Also, the node may determine whether a channel is allocated by analyzing the CSMA idle information if the CAP is in idle state.

For example, if there is a channel allocated, the node may determine a transmission time by determining whether there is a shared channel, and keep its transmission (TX) function turned off until the determined transmission time is reached. Once the determined transmission time is reached, the node may transmit data and keep its RX function turned off continuously until the next beacon reception time. On the other hand, if there is no channel allocated, the node may keep its RX function turned off until the next beacon reception time.

According to the present embodiment, the node may determine whether a channel is allocated by analyzing the CSMA idle information if the contention period is not in idle state. At this time, if there is a channel allocated, the node may determine a transmission time by determining whether there is a shared channel, receive data during the CAP, and process the received data. After the contention period ends, the node may turn off its RX function, check whether the transmission time is reached. Also, the node keep its RX function turned off until the transmission time is reached, and transmit data when the transmission time is reached. On the other hand, if there is no channel allocated, the node may receive data and process the received data during the CAP. Then, after the CAP ends, the node may keep the RX function turned off continuously until the beacon reception time.

The methods according to exemplary embodiments of the present disclosure may be implemented as program instructions executable by a variety of computers and recorded on a computer readable medium. The computer readable medium may include a program instruction, a data file, a data structure, or a combination thereof. The program instructions recorded on the computer readable medium may be designed and configured specifically for the present disclosure or can be publicly known and available to those who are skilled in the field of computer software. Examples of the computer readable medium may include a hardware device such as ROM, RAM, and flash memory, which are specifically configured to store and execute the program instructions. Examples of the program instructions include machine codes made by, for example, a compiler, as well as high-level language codes executable by a computer, using an interpreter. The above exemplary hardware device can be configured to operate as at least one software module in order to perform the operation of the present disclosure, and vice versa.

While the embodiments of the present disclosure and their advantages have been described in detail above, it should be understood that various changes, substitutions and alterations may be made herein without departing from the scope of the disclosure.

A number of examples have been described above. Nevertheless, it should be understood that various modifications may be made. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. An operation method of a personal area network (PAN) coordinator in a sensor network, the operation method comprising:
   generating, by the PAN coordinator, channel allocation information by identifying presence of an available channel based on a channel allocation request received from at least one node in a contention-free period (CFP);
   generating, by the PAN coordinator, carrier sensing multiple access (CSMA) idle information according to whether data to be transmitted to one of the plurality of nodes exists in a contention access period (CAP); and transmitting, by the PAN coordinator, a beacon including the channel allocation information and the CSMA idle information, wherein the CSMA idle information includes a CSMA collision avoidance (CSMA-CA) transmission (TX) indication, the CSMA-CA TX indication is set to a value when there is no data to be transmitted in the CAP, and the CSMA-CA TX indication is set to another value when there is data to be transmitted in the CAP.

2. The operation method according to claim 1, wherein when the available channel is present in the CFP, the channel allocation information includes a beacon sequence number (BSN), number of channels, and at least one set of {node address, starting slot, and channel size}.

3. The operation method according to claim 1, wherein when the available channel is not present in the CFP, the channel allocation information includes a beacon sequence number (BSN), number of channels, at least one set of {node address, starting slot, and channel size}, number of shared channels, and at least one set of {channel number, and node address}.

4. The operation method according to claim 1, wherein the CSMA idle information further includes number of nodes and a set of node addresses.

5. An operation method of a sensor node in a sensor network, the operation method comprising:

receiving, by the sensor node, a beacon from a personal area network (PAN) coordinator;

extracting, by the sensor node, the channel allocation information and the CSMA idle information from the beacon;

determining, by the sensor node, whether the CAP is in idle state based on the extracted channel allocation information and the CSMA idle information; and performing, by the sensor node, communications with the PAN coordinator in the CAP when the CAP is determined in the idle state, wherein the CSMA idle information includes a CSMA collision avoidance (CSMA-CA) transmission (TX) indication, the CSMA-CA TX indication is set to a value when there is no data to be transmitted in the CAP, and the CSMA-CA TX indication is set to another value when there is data to be transmitted in the CAP.

6. The operation method according to claim 5, wherein when the available channel is present in the CFP, the channel allocation information includes a beacon sequence number (BSN), number of channels, and at least one set of {sensor node address, starting slot, and channel size}.

7. The operation method according to claim 5, wherein when the available channel is not present in the CFP, the channel allocation information includes a beacon sequence number (BSN), number of channels, at least one set of {sensor node address, starting slot, and channel size}, number of shared channels, and at least one set of {channel number, and sensor node address}.

8. The operation method according to claim 5, wherein the CSMA idle information further includes number of sensor nodes and a set of sensor node addresses.

9. The operation method according to claim 5, wherein in the performing communications with the PAN coordinator:

determining whether or not a channel is allocated to the sensor node;

when a channel is allocated to the sensor node, determining a transmission time by checking a channel sharing status, keeping a reception function turned off until the transmission time, transmitting data at the transmission time, and keeping the reception function turned off until reception of a next beacon; and when a channel is not allocated to the sensor node, keeping the reception function turned off continuously until reception of the next beacon.

10. The operation method according to claim 5, wherein in the performing communications with the PAN coordinator:

when the CAP is not in idle state, determining whether or not a channel is allocated to the sensor node;

when a channel is allocated to the sensor node, determining a transmission time, receiving data during the CAP, processing the received data, turning off a reception function after the CAP ends, and transmitting data at the transmission time while keeping the reception function turned off except for the transmission time; and when a channel is not allocated to the sensor node, keeping the reception function turned off continuously until reception of the next beacon.

11. The operation method according to claim 5, wherein in the performing communications with the PAN coordinator, obtaining information on a channel allocated to the sensor node and information on whether the allocated channel is shared by another sensor node from the channel allocation information, transmitting data through the allocated channel of every frame when the allocated channel is a dedicated channel, and determining a total number of sensor nodes sharing the allocated channel and a frame used for transmission of the sensor node based on a beacon sequence number (BSN) when the allocated channel is a shared channel.

12. The operation method according to claim 11, wherein in the performing communications with the PAN coordinator, determining whether each frame is a frame used for transmission of the sensor node, and transmitting data through a frame determined as the frame used for transmission of the sensor node in order to avoid transmission collisions with other sensor nodes.

13. The operation method according to claim 5, wherein in the performing communications with the PAN coordinator, determining whether there is data to be received at the sensor node during the CAP by analyzing the CSMA idle information, receiving the data during the CAP by turning on a reception function when there is data to be received, and keeping the reception function turned off during the CAP when there is no data to be received.

* * * * *